(12) United States Patent
He et al.

(10) Patent No.: US 11,824,170 B2
(45) Date of Patent: Nov. 21, 2023

(54) WAKE-UP CIRCUIT AND RECHARGEABLE DEVICE

(71) Applicant: CONTEMPORARY AMPEREX TECHNOLOGY CO., LIMITED, Ningde (CN)

(72) Inventors: Xin He, Ningde (CN); Zhiwei Yan, Ningde (CN); Fupeng Cai, Ningde (CN); Lidan Yan, Ningde (CN); Fuming Ye, Ningde (CN); Fangjie Zhou, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 522 days.

(21) Appl. No.: 17/134,020

(22) Filed: Dec. 24, 2020

(65) Prior Publication Data
US 2021/0119271 A1   Apr. 22, 2021

Related U.S. Application Data

(63) Continuation of application No. PCT/CN2020/096414, filed on Jun. 16, 2020.

(30) Foreign Application Priority Data

Aug. 12, 2019 (CN) .......................... 201921297373.4

(51) Int. Cl.
*H01M 10/42* (2006.01)
*H01M 10/44* (2006.01)
*H02J 7/00* (2006.01)

(52) U.S. Cl.
CPC ..... *H01M 10/4257* (2013.01); *H01M 10/446* (2013.01); *H02J 7/0031* (2013.01); *H01M 2010/4278* (2013.01)

(58) Field of Classification Search
CPC .......................... H01M 10/4257; H02J 7/0031
(Continued)

(56) References Cited

U.S. PATENT DOCUMENTS

| 5,896,043 A | 4/1999 | Kumagai |
| 5,991,887 A | 11/1999 | Ezell |

(Continued)

FOREIGN PATENT DOCUMENTS

| CN | 104882940 A | 9/2015 |
| CN | 105365593 A | 3/2016 |

(Continued)

OTHER PUBLICATIONS

The World Intellectual Property Organization (WIPO) International Search Report and Written Opinion for PCT/CN2020/096414 dated Sep. 18, 2020 13 pages (including English translation).

(Continued)

*Primary Examiner* — Suchin Parihar
(74) *Attorney, Agent, or Firm* — ANOVA LAW GROUP, PLLC

(57) ABSTRACT

Embodiments of this application relate to the field of circuit technologies. A wake-up circuit and a rechargeable device are disclosed. The wake-up circuit includes an input control module, a drive module, and an output control module. The input control module, the drive module, and the output control module each are connected to an auxiliary power supply. The input control module is configured to output a first level signal when an external voltage signal is received. The drive module is configured to, when the first level signal is received, output a second level signal that lasts for a first preset time. The output control module is configured to, when the second level signal is received, output a wake-up signal that lasts for the first preset time to a battery management system. According to this application, the wake-up (Continued)

circuit and the BMS consume less power of the auxiliary power supply.

6 Claims, 3 Drawing Sheets

(58) Field of Classification Search
USPC .......................................................... 320/134
See application file for complete search history.

(56) References Cited

U.S. PATENT DOCUMENTS

| | | | |
|---|---|---|---|
| 2001/0010491 A1* | 8/2001 | Marneweck | H04W 52/0238 |
| | | | 455/343.1 |
| 2013/0096744 A1* | 4/2013 | Sah | B60W 20/40 |
| | | | 180/65.265 |
| 2017/0355268 A1* | 12/2017 | Roberts | B60L 53/11 |
| 2018/0159574 A1 | 6/2018 | Li et al. | |
| 2018/0159634 A1* | 6/2018 | Lo | G08C 23/04 |
| 2019/0017311 A1* | 1/2019 | McGettrick | E05F 15/697 |
| 2019/0341803 A1* | 11/2019 | Cook | H03K 3/037 |
| 2020/0278386 A1* | 9/2020 | Patton | G07C 5/008 |
| 2020/0324722 A1* | 10/2020 | Grasi | H02J 7/00041 |
| 2020/0353826 A1* | 11/2020 | Yaldo | B60L 53/66 |
| 2021/0039519 A1* | 2/2021 | Lee | B60L 58/12 |
| 2022/0337074 A1* | 10/2022 | Lee | H02J 7/00712 |
| 2023/0058031 A1* | 2/2023 | DeDona | B60L 53/16 |

FOREIGN PATENT DOCUMENTS

| | | |
|---|---|---|
| CN | 206235687 U | 6/2017 |
| CN | 107487201 A | 12/2017 |
| CN | 207106201 U | 3/2018 |
| CN | 108123509 A | 6/2018 |
| CN | 208241351 U | 12/2018 |
| EP | 1919059 A2 | 5/2008 |
| WO | 2019093769 A1 | 5/2019 |

OTHER PUBLICATIONS

The European Patent Office (EPO) Extended Search Report for EP Application No. 20827978 dated Sep. 6, 2021 4 Pages.
The European Patent Office (EPO) Summons to Attend Oral Proceedings Pursuant to Rule 115(1) EPC for EP Application No. 20827978.6 Oct. 21, 2022 13 Pages.
The European Patent Office (EPO) The First Office Action for EP Application No. 20827978.6 May 6, 2022 9 Pages.
The European Patent Office (EPO) Decision to Grant a Priority for EP Application No. 20827978.6 Mar. 21, 2023 29 Pages.
"NE555 and NE556 Applications", Philips Semiconductors, Dec. 1988, pp. 1-19.
The China National Intellectual Property Administration (CNIPA) Notification On the Grant for Patent Right for Utility Model for Chinese Application 201921297373.4, Apr. 26, 2023 2Pages (including English translation).

* cited by examiner

WAKE-UP CIRCUIT AND RECHARGEABLE DEVICE

CROSS REFERENCE TO RELATED APPLICATIONS

This application is a continuation application of PCT Patent Application No. PCT/CN2020/096414, entitled "WAKE-UP CIRCUIT AND RECHARGEABLE DEVICE" filed on Jun. 16, 2020, which claims priority to Chinese Patent Application No. 201921297373.4, entitled "WAKE-UP CIRCUIT AND RECHARGEABLE DEVICE" filed with the State Intellectual Property Office of the People's Republic of China on Aug. 12, 2019, all of which are incorporated herein by reference in their entirety.

TECHNICAL FIELD

Embodiments of this application relate to the field of circuit technologies, and in particular, to a wake-up circuit and a rechargeable device.

BACKGROUND

As battery technologies evolve, the automobile industry is witnessing a development tendency that electric vehicles are replacing fuel vehicles. To charge an electric vehicle, a charging plug is plugged to wake up a battery management system (BMS) of the electric vehicle through a wake-up circuit, so that the electric vehicle can be charged.

The inventor finds that there are at least the following problems in the prior art: A wake-up circuit of an electric vehicle is powered by a separate auxiliary battery, and the wake-up circuit stays in a working state once a charging plug is plugged until the charging plug is removed, consuming a large amount of power of the auxiliary battery. In addition, the battery management system continuously consumes the power of the auxiliary battery.

SUMMARY

An objective of embodiments of this application is to provide a wake-up circuit and a rechargeable device. When an external voltage signal is input, a drive module and an output control module remain in a working state only for a first preset time. In this way, the wake-up circuit consumes less power from an auxiliary power supply. In addition, when charging is completed, even if the wake-up circuit can still receive the external voltage signal, the wake-up circuit no longer outputs a wake-up signal to a BMS, so that the BMS can enter a sleep state. In this way, the BMS consumes less power from the auxiliary power supply.

An embodiment of this application provides a wake-up circuit, including an input control module, a drive module, and an output control module. The input control module, the drive module, and the output control module each are connected to an auxiliary power supply. The input control module is configured to output a first level signal to the drive module when an external voltage signal is received. The drive module is configured to, when the first level signal is received, output a second level signal that lasts for a first preset time to the output control module. The output control module is configured to, when the second level signal is received, output a wake-up signal that lasts for the first preset time to a battery management system.

An embodiment of this application further provides a rechargeable device, including the foregoing wake-up circuit, an auxiliary power supply, and a battery management system.

Compared with the prior art, according to this embodiment of this application, the wake-up circuit is powered by the auxiliary power supply. The input control module of the wake-up circuit first outputs the first level signal when the external voltage signal is received. When the first level signal is received, the drive module outputs the second level signal that lasts for the first preset time. The output control module outputs the wake-up signal during a time period when the second level signal is received. To be specific, the wake-up signal lasts for the first preset time and is output to the battery management system, to wake up the battery management system for charging. Therefore, when the external voltage signal is input, the drive module and the output control module remain in a working state only for the first preset time. In this way, the wake-up circuit consumes less power from the auxiliary power supply. In addition, when the charging is completed, even if the wake-up circuit can still receive the external voltage signal, the wake-up circuit no longer outputs the wake-up signal to the BMS, so that the BMS can enter a sleep state. In this way, the BMS consumes less power from the auxiliary power supply.

In addition, the drive module includes at least a drive unit. The drive unit is configured to, when the first level signal is received, output the second level signal that lasts for the first preset time. This embodiment provides a specific implementation of the drive module.

In addition, the drive module further includes a delay unit. The drive unit is configured to, when the first level signal is received, output, by using the delay unit, the second level signal that lasts for the first preset time. In this embodiment, the second level signal that lasts for the first preset time is output by the drive unit by using the delay unit, thereby saving costs.

In addition, the drive unit is specifically configured to, when the first level signal is received, output a third level signal that lasts for a second preset time, where the second preset time is less than the first preset time. The delay unit is configured to, when the third level signal is received, output the second level signal that lasts for the first preset time.

In addition, the drive unit includes a first capacitor, a first resistor, and a second resistor. A first end of the first resistor is connected to a first end of the second resistor, a second end of the first resistor is configured to receive a first voltage signal from the auxiliary power supply, and a second end of the second resistor is grounded. A first end of the first capacitor is configured to receive the first level signal, a second end of the first capacitor is connected to a junction of the first resistor and the second resistor, and the second end of the first capacitor is configured to output the third level signal that lasts for the second preset time. This embodiment provides a specific structure of the driving unit.

In addition, the delay unit is a delay chip. A first input end of the delay chip is configured to receive the third level signal, a second input end of the delay chip is configured to receive a first voltage signal from the auxiliary power supply, and an output end of the delay chip is configured to output the second level signal that lasts for the first preset time. This embodiment provides a specific structure of the delay unit.

In addition, the input control module includes a second capacitor, a reverse protection diode, a first MOS transistor, an optical coupler, a third resistor, and a fourth resistor. An anode of the reverse protection diode is configured to receive the external voltage signal, and a cathode of the reverse protection diode is connected to one end of the second capacitor. The other end of the second capacitor is grounded. A gate of the first MOS transistor is connected to a junction of the reverse protection diode and the second capacitor, a source of the first MOS transistor is grounded, and a drain of the first MOS transistor is connected to a first input end of the optical coupler. A second input end of the optical coupler is configured to receive a second voltage signal from the auxiliary power supply, a first output end of the optical coupler is grounded through the fourth resistor, and a second output end of the optical coupler is connected to one end of the third resistor. The other end of the third resistor is further configured to receive a first voltage signal from the auxiliary power supply. The second output end of the optical coupler is further configured to output the first level signal. This embodiment provides a specific structure of the input control module.

In addition, the output control module includes a triode, a fifth resistor, a sixth resistor, a second MOS transistor, and a third MOS transistor. A base of the triode is configured to receive the second level signal, an emitter of the triode is configured to receive a first voltage signal from the auxiliary power supply, and a collector of the triode is connected to one end of the fifth resistor. The other end of the fifth resistor is connected to one end of the sixth resistor, and the other end of the sixth resistor is grounded. A gate of the second MOS transistor is connected to a junction of the fifth resistor and the sixth resistor, a source of the second MOS transistor is grounded, and a drain of the second MOS transistor is connected to a gate of the third MOS transistor. A source of the third MOS transistor is configured to receive a second voltage signal from the auxiliary power supply, and a drain of the third MOS transistor is configured to output the wake-up signal. When the second level signal is received, the triode is turned on, so that the second MOS transistor and the third MOS transistor are turned on, and the turned-on third MOS transistor outputs the wake-up signal. This embodiment provides a specific structure of the output control module.

In addition, the rechargeable device is a vehicle.

BRIEF DESCRIPTION OF DRAWINGS

One or more embodiments are illustrated by using a diagram in the corresponding drawings. The illustration is not intended to limit any embodiment. In the drawings, components with the same reference signs are similar to each other. Unless otherwise specified, a diagram in the drawings does not constitute any scale limitation.

DESCRIPTION OF EMBODIMENTS

To make objectives, technical schemes, and advantages of embodiments of this application clearer, the following further describes the embodiments of this application in detail with reference to the accompanying drawings. However, a person of ordinary skill in the art may understand that many technical details are put forward in the embodiments of this application to make a reader better understand this application. However, even without these technical details and changes and modifications based on the following embodiments, the technical schemes claimed in this application can still be implemented.

Figure 1:
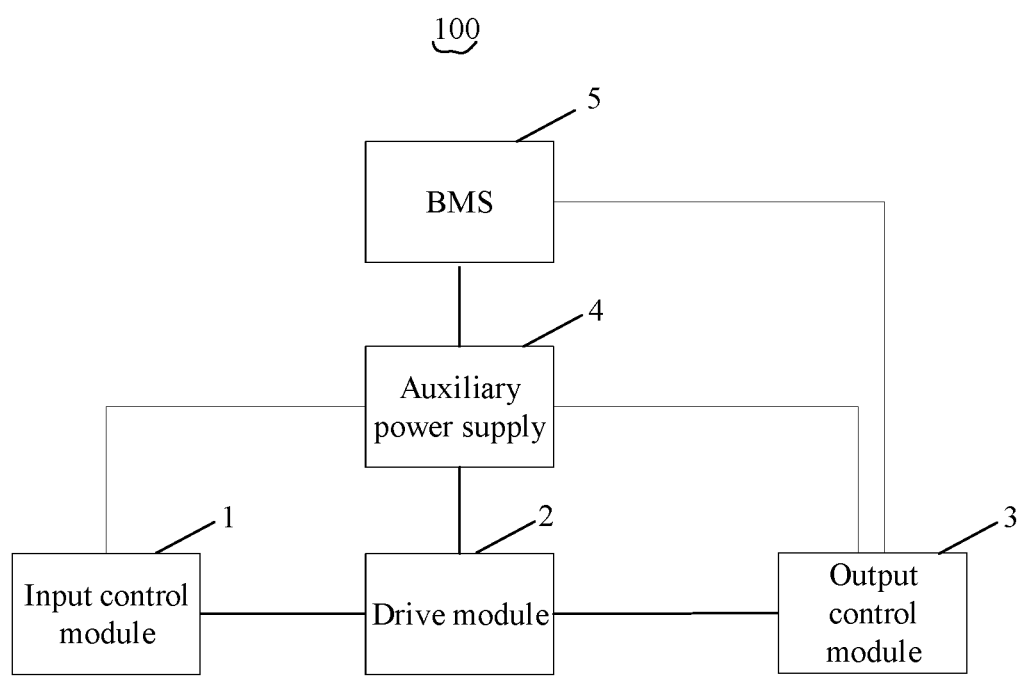
FIG. 1 is a schematic block diagram of a wake-up circuit according to a first embodiment of this application.

A first embodiment of this application relates to a wake-up circuit 100 that is configured to output a wake-up signal to wake up a BMS of a rechargeable device. For example, the rechargeable device is a vehicle. The wake-up circuit 100 is powered by an auxiliary power supply of the vehicle. The auxiliary power supply is further configured to power the BMS, and the auxiliary power supply may be a lead-acid battery. Referring to FIG. 1, the wake-up circuit 100 includes an input control module 1, a drive module 2, and an output control module 3. The input control module 1, the drive module 2, and the output control module 3 each are connected to an auxiliary power supply 4 of the vehicle. The output control module 3 is further connected to a BMS 5, and the auxiliary power supply 4 is further connected to the BMS 5.

The input control module 1 outputs a first level signal to the drive module 2 when an external voltage signal is received. The external voltage signal may be a voltage source signal from a charging pile. When a charging plug of the charging pile is plugged into a charging port of the vehicle, the charging plug is connected to the vehicle. The input control module 1 receives the external voltage signal from the charging pile and outputs the first level signal to the drive module 2. The first level signal may be a high-level signal or a low-level signal relative to a reference terminal, where the reference terminal may be a ground terminal.

After the first level signal output by the input control module 1 is received, the drive module 2 outputs a second level signal that lasts for a first preset time to the output control module 3. The second level signal may also be a high-level signal or a low-level signal relative to the reference terminal.

The output control module 3 outputs a wake-up signal during a time period when the second level signal output by the drive module 2 is received. To be specific, the wake-up signal lasts for the first preset time and is output to the BMS 5, to wake up the BMS 5 to charge a battery group of the vehicle. In addition, the second level signal lasts for the first preset time, and the wake-up signal also lasts for the first preset time. In other words, a working time of the drive module 2 and the output control module 3 is the first preset time. When charging of the battery group of the vehicle is completed, even if the charging plug is still connected to the vehicle, in other words, the wake-up circuit 100 can still receive the external voltage signal, the wake-up circuit 100 no longer outputs the wake-up signal to the BMS. Therefore, the BMS can enter a sleep state. The first preset time needs to be greater than a minimum time for waking up the BMS 5.

Compared with the prior art, according to this embodiment, the wake-up circuit 100 is powered by the auxiliary power supply 4. The input control module 1 of the wake-up circuit first outputs the first level signal when the external voltage signal is received. When the first level signal is received, the drive module outputs the second level signal that lasts for the first preset time. The output control module outputs the wake-up signal during the time period when the second level signal is received. To be specific, the wake-up signal lasts for the first preset time and is output to the battery management system, to wake up the battery management system for charging. Therefore, when the external voltage signal is input, the drive module 2 and the output control module 3 remain in a working state only for the first preset time. In this way, the wake-up circuit 100 consumes less power from the auxiliary power supply 4. In addition, when the charging is completed, even if the wake-up circuit 100 can still receive the external voltage signal, the wake-up circuit 100 no longer outputs the wake-up signal to the BMS, so that the BMS can enter the sleep state. In this way, the BMS consumes less power from the auxiliary power supply 4.

Figure 2:
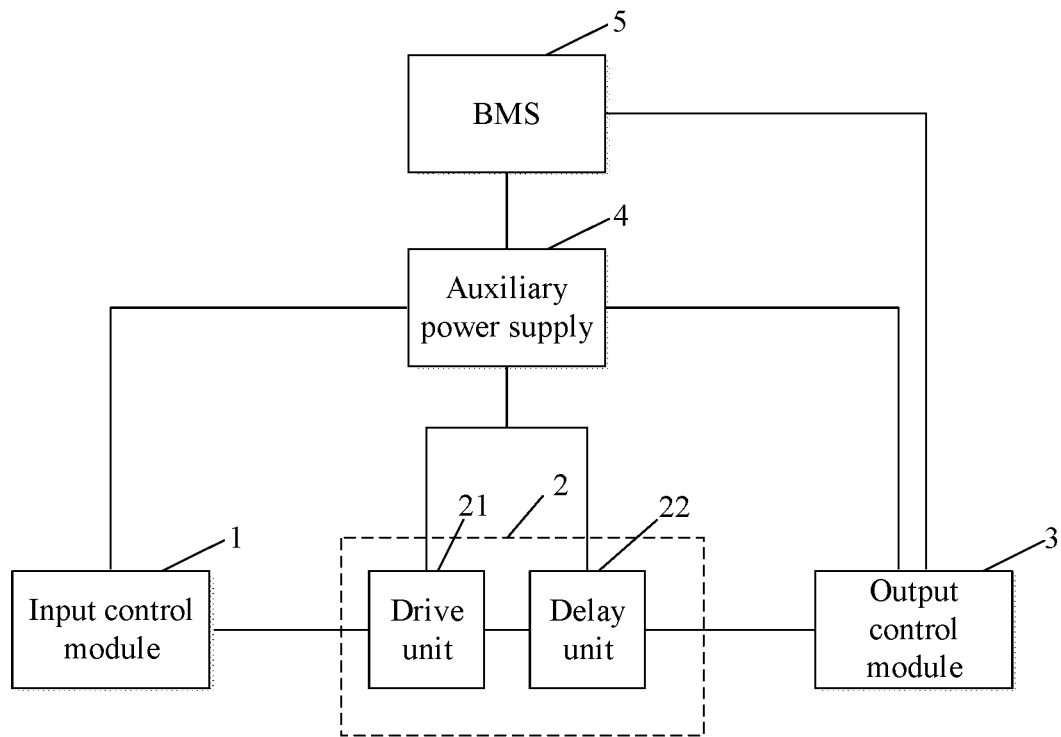
FIG. 2 is a schematic block diagram of a wake-up circuit according to a second embodiment of this application.

A second embodiment of this application relates to a wake-up circuit 100. The second embodiment differs from the first embodiment in that a specific structure of the drive module 2 is provided, as shown in FIG. 2.

In this embodiment, the drive module 2 includes at least a drive unit 21. After the first level signal output by the input control module 1 is received, the drive unit 21 outputs the second level signal that lasts for the first preset time to the output control module 3. The second level signal may also be a high-level signal or a low-level signal.

In an example, the drive module 2 further includes a delay unit 22. After the first level signal output by the input control module 1 is received, the drive unit 21 outputs, by using the delay unit 22, the second level signal that lasts for the first preset time to the output control module 3. Specifically, after the first level signal output by the input control module 1 is received, the drive unit 21 outputs a third level signal that lasts for a second preset time to the delay unit 22, where the second preset time is less than the first preset time. The delay unit 22 outputs the second level signal during a time period when the third level signal is received. A delay time is preset in the delay unit 22, so that a time of outputting the second level signal by the delay unit is a sum of the second preset time and the delay time, namely, the first preset time.

Compared with the first embodiment, this embodiment provides a specific structure of the drive module 2.

Figure 3:
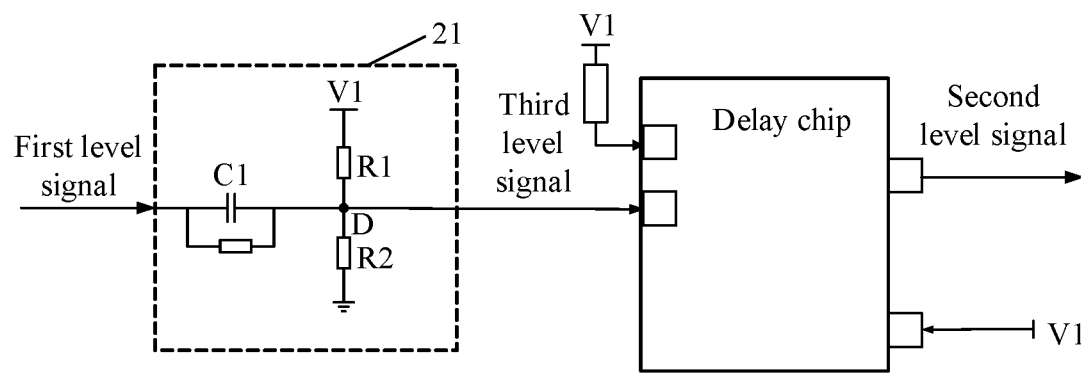
FIG. 3 is a circuit structure diagram of a drive module of a wake-up circuit according to a third embodiment of this application.

A third embodiment of this application relates to a wake-up circuit 100. The third embodiment differs from the second embodiment in that specific structures of the drive unit 21 and the delay unit 22 are provided, as shown in FIG. 3. It should be noted that for conciseness of the drawings, FIG. 3 merely shows examples of the structures of the drive unit and the delay unit of the wake-up circuit 100.

In this embodiment, the drive unit 21 includes a first capacitor C1, a first resistor R1, and a second resistor R2. A first end of the first resistor R1 is connected to a first end of the second resistor R2, and a second end of the second resistor R2 is grounded. A second end of the first resistor R1 is connected to the auxiliary power supply 4 and receives a first voltage signal V1 from the auxiliary power supply 4. For example, the first voltage signal V1 is a 3.3 V voltage signal. A first end of the first capacitor C1 is connected to the input control module 1 and receives the first level signal output by the input control module 1. A second end of the first capacitor C1 is connected to a junction D of the first resistor R1 and the second resistor R2. The second end of the first capacitor C1 outputs the third level signal that lasts for the second preset time. In addition, a resistor may be connected in parallel between two ends of the first capacitor C1. The resistor participates in charging or discharging during a charging or discharging process of the first capacitor C1, increasing a delay time of the charging or discharging. When the first capacitor C1 is fully charged, the two ends of the first capacitor C1 are in an open circuit state. In this case, the resistor can maintain an electrical connection of the first capacitor C1.

In this embodiment, the delay unit 22 may be a delay chip, specifically a programmable delay chip. A first input end of the delay chip is connected to an output end of the drive unit 21, that is, connected to a junction D. A second input end of the delay chip is connected to the auxiliary power supply 4 and receives a first voltage signal V1 from the auxiliary power supply 4. For example, the first voltage signal V1 is a 3.3 V voltage signal. An output end of the delay chip is configured to output the second level signal that lasts for the first preset time. In addition, a power supply end of the delay chip also receives the first voltage signal V1 from the auxiliary power supply 4. In an example, a protective clamping circuit may further be provided between the junction D and the first input end of the delay chip, so that a voltage of the third level signal input to the delay chip is within a preset range.

For example, the first level signal is a low-level signal. When the first end of the first capacitor C1 receives the low-level first level signal, a voltage difference between the two ends of the capacitor is unable to be abruptly changed. Therefore, a voltage at the second end of the first capacitor C1 immediately changes to a low level, and then the first voltage signal V1 charges the first capacitor C1. In this case, the drive unit 21 is in a working state and consumes power from the auxiliary power supply 4, and the second end of the first capacitor C1 slowly rises to a high level. During a time period when the capacitor is being charged (namely, the second preset time), the second end of the first capacitor C1 outputs a low-level third level signal to the delay chip. When the second end of the first capacitor C1 rises to a high level, the drive unit 21 restores to an initial state and almost no longer consumes power from the auxiliary power supply 4. When the third level signal is received, the delay chip is triggered to enter a working state, consumes power from the auxiliary power supply 4, and outputs the second level signal. A delay time is preset in the delay chip. Therefore, a time of outputting the second level signal by the delay chip is a sum of the second preset time and the delay time, namely, the first preset time. When the third level signal is no longer received, delay unit 22 restores to an initial state and almost no longer consumes power from the auxiliary power supply 4. In this case, a voltage threshold of a high or low level is preset in the delay chip. A level of the third level signal input to the delay chip may be adjusted by adjusting a resistance of the first resistor R1 or a resistance of the second resistor R2.

It should be noted that this embodiment is described by using an example in which the first level signal is a low-level signal. However, the first level signal is not limited thereto. The first level signal may alternatively be a high-level signal. In this case, the drive unit 21 may be adjusted to enable the drive unit 21 to continue to output the low-level third level signal. Alternatively, the drive unit 21 may be enabled to output a high-level third level signal, and, by adjusting the delay chip, a high level may be set as a trigger condition for the time-delay chip to enter a working state and output the second level signal that lasts for the first preset time.

Compared with the second embodiment, this embodiment provides specific structures of the drive unit and the delay unit.

A fourth embodiment of this application relates to a wake-up circuit 100. The fourth embodiment differs from the first embodiment in that a specific structure of the input control module 1 is provided.

Figure 4:
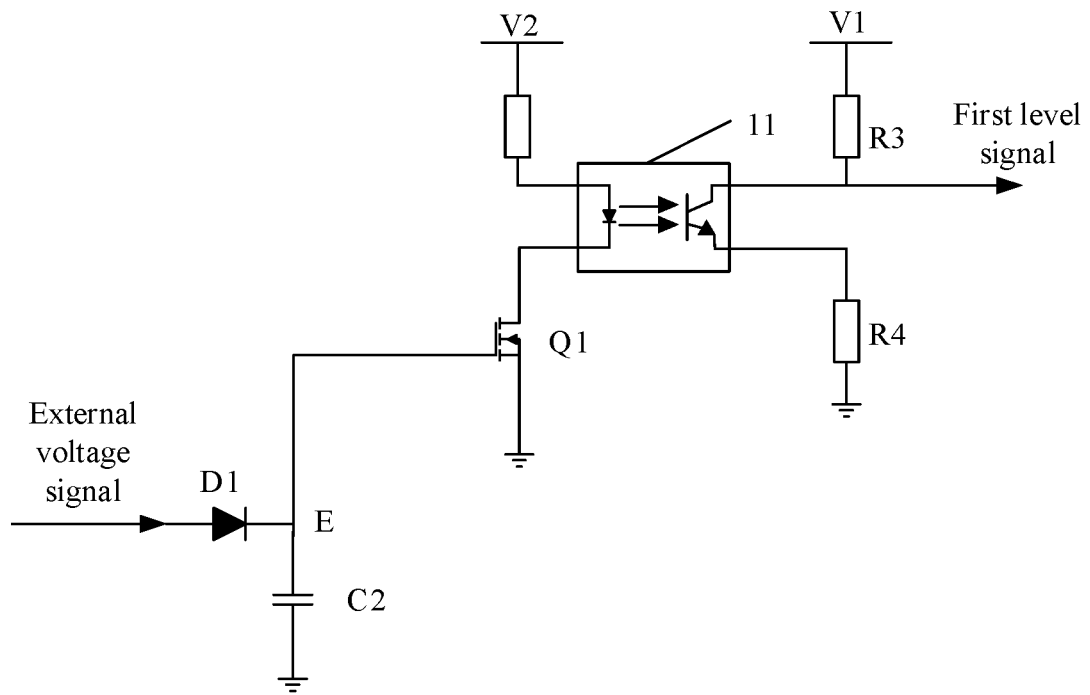
FIG. 4 is a circuit structure diagram of an input control module of a wake-up circuit according to a fourth embodiment of this application.

In this embodiment, referring to FIG. 4, the input control module 1 includes a second capacitor C2, a reverse protection diode D1, a first MOS transistor Q1, an optical coupler 11, a third resistor R3, and a fourth resistor R4. It should be noted that for conciseness of the drawings, FIG. 4 merely shows an example of the structure of the input control module 1 of the wake-up circuit 100.

In this embodiment, an anode of the reverse protection diode D1 is configured to receive the external voltage signal, and a cathode of the reverse protection diode D1 is connected to one end of the second capacitor C2. The other end of the second capacitor C2 is grounded. A gate of the first MOS transistor Q1 is connected to a junction E of the reverse protection diode D1 and the second capacitor C2, a source of the first MOS transistor Q1 is grounded, and a drain of the first MOS transistor Q1 is connected to a first input end of the optical coupler 11. A second input end of the optical coupler 11 is connected to the auxiliary power supply 4. The optical coupler 11 may be connected to the auxiliary power supply 4 through a resistor, and is configured to receive a second voltage signal V2 from the auxiliary power supply 4. The second voltage signal V2 may be a 24 V voltage signal. A first output end of the optical coupler 11 is grounded through the fourth resistor R4, and a second output end of the optical coupler 11 is connected to one end of the third resistor R3. The other end of the third resistor R3 is connected to the auxiliary power supply 4 and is configured to receive a first voltage signal V1 from the auxiliary power supply 4. For example, the first voltage signal V1 is a 3.3 V voltage signal. The second output end of the optical coupler 11 is further configured to output the first level signal to the drive module 2. In this case, the first input end and the second input end of the optical coupler 11 correspond to a light emitting end of the optical coupler 11. The first output end and the second output end of the optical coupler 11 correspond to a light receiving end of the optical coupler 11.

Specifically, when the charging plug of the charging pile is plugged into the charging port of the vehicle, the reverse protection diode D1 of the input control module 1 receives the external voltage signal from the charging pile. The external voltage signal may be a periodic alternating voltage signal. When an alternating voltage passes through the reverse protection diode D1, the second capacitor C2 is charged. When charging of the second capacitor C2 is completed, the first MOS transistor Q1 is turned on. The first MOS transistor Q1 may be an NMOS transistor. When the first MOS transistor Q1 is turned on, the optical coupler 11 is subsequently turned on, so that outputting a high-level first level signal or a low-level first level signal may be determined by adjusting a resistance value of the third resistor R3 or the fourth resistor R4. For example, outputting a low-level first level signal is determined by adjusting a resistance value of the third resistor R3 to a value less than that of the fourth resistor R4. When the alternating voltage signal is at a high level, the second capacitor C2 is charged. When the alternating voltage signal is at a low level, the second capacitor C2 is kept at a high level due to an effect of the reverse protection diode D1, thereby preventing the second capacitor C2 from being pulled down to a low level. In addition, a discharge circuit may also be connected in parallel between two ends of the second capacitor C2, so that the second capacitor C2 is able to be discharged through the discharge circuit when the alternating voltage signal is at a low level.

Compared with the first embodiment, this embodiment provides a specific structure of the input control module 1. It should be noted that this embodiment may also be used as an improvement on the basis of the second embodiment or the third embodiment to achieve a same technical effect.

A fifth embodiment of this application relates to a wake-up circuit. The fifth embodiment differs from the first embodiment in that a specific structure of the output control module 3 is provided.

Figure 5:
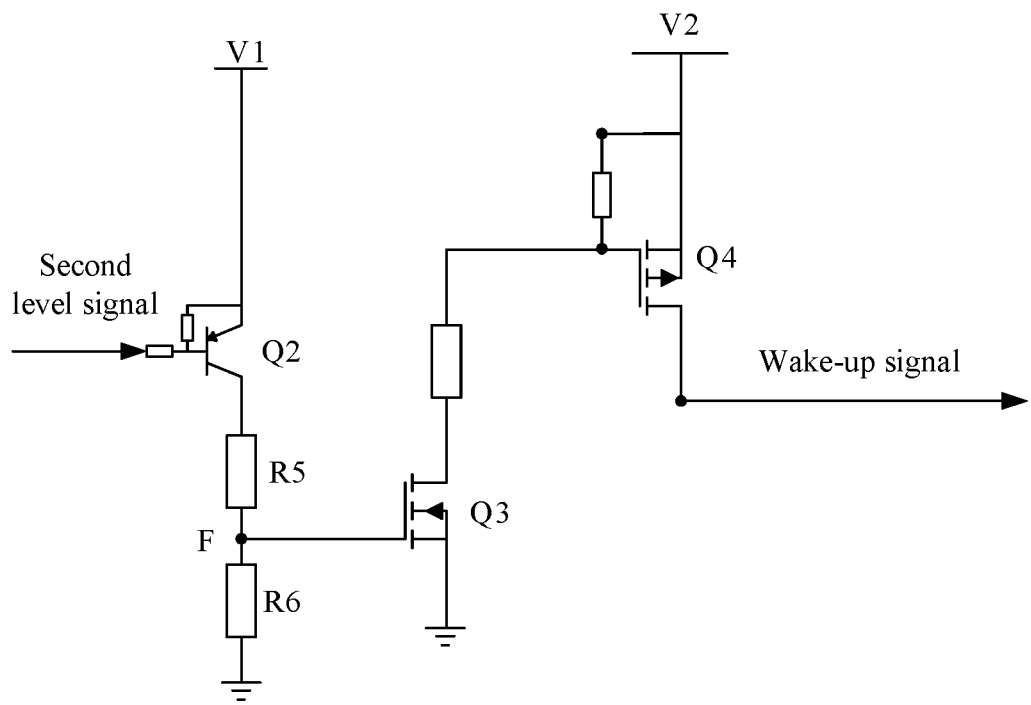
FIG. 5 is a circuit structure diagram of an output control module of a wake-up circuit according to a fifth embodiment of this application.

In this embodiment, referring to FIG. 5, the output control module 3 includes a triode Q2, a fifth resistor R5, a sixth resistor R6, a second MOS transistor Q3, and a third MOS transistor Q4.

A base of the triode Q2 is connected to the drive module 2 and is configured to receive the second level signal. An emitter of the triode Q2 is connected to the auxiliary power supply 4 and is configured to receive a first voltage signal V1 from the auxiliary power supply. For example, the first voltage signal V1 is a 3.3 V voltage signal. A collector of the triode Q2 is connected to one end of the fifth resistor R5. The other end of the fifth resistor R5 is connected to one end of the sixth resistor R6, and the other end of the sixth resistor R6 is grounded. A gate of the second MOS transistor Q3 is connected to a junction F of the fifth resistor R5 and the sixth resistor R6, a source of the second MOS transistor Q3 is grounded, and a drain of the second MOS transistor Q3 is connected to a gate of the third MOS transistor Q4. A source of the third MOS transistor Q4 is connected to the auxiliary power supply 4 and is configured to receive a second voltage signal from the auxiliary power supply 4. For example, the second voltage signal V2 is a 24 V voltage signal. A drain of the third MOS transistor Q4 outputs the wake-up signal. It should be noted that the base of the triode Q2 or the gate of the third MOS transistor Q4 is further provided with a peripheral circuit for driving or protection. For example, in FIG. 5, the base of the triode Q2 is connected to a resistor, the gate of the third MOS transistor Q4 is connected to a resistor, a resistor is connected in parallel between the base and the emitter of the triode Q2, and a resistor is connected in parallel between the source and the gate of the third MOS transistor Q4.

For example, in the following, the received second level signal is a low-level signal. In this case, a resistance of the fifth resistor R5 is set to a value less than that of the sixth resistor R6, so that when the triode Q2 is turned on, a voltage across the sixth resistor R6 is greater than that across the fifth resistor R5, the second MOS transistor Q3 is turned on, and the third MOS transistor Q4 is subsequently turned on. The second MOS transistor Q3 is an NMOS transistor and the third MOS transistor Q4 is a PMOS transistor. In this way, the drain of the third MOS transistor Q4 outputs the second voltage signal as the wake-up signal to the BMS 5 to wake up the BMS 5.

Compared with the first embodiment, this embodiment provides a specific structure of the input control module 1. It should be noted that this embodiment may also be used as an improvement on the basis of the second embodiment to the fourth embodiment to achieve a same technical effect.

A sixth embodiment of this application relates to a rechargeable device. For example, the rechargeable device is a vehicle. The vehicle includes the wake-up circuit 100 according to any one of the first embodiment to the fifth embodiment, an auxiliary power supply 4, and a BMS. The wake-up circuit is powered by the auxiliary power supply 4 of the vehicle. The auxiliary power supply 4 is further configured to power the BMS. The auxiliary power supply 4 may be a lead-acid battery.

A person of ordinary skill in the art may understand that the forgoing embodiments are specific embodiments, and in practical application, however, various modifications and variations to the embodiments may be made without departing from the spirit and scope of this application.

What is claimed is:

1. A rechargeable device, comprising a battery group, a battery management system for charging the battery group, a charging port for connecting a charging plug of a charging pile to the rechargeable device, a wake-up circuit for waking up the battery management system, and an auxiliary power supply, wherein the wake-up circuit, comprises an input control module, a drive module, and an output control module, the input control module, the drive module, the battery management system, and the output control module are each connected to the auxiliary power supply, the input control module is configured to output a first level signal when an external voltage signal is received, the external voltage signal being a voltage source signal from a charging pile when the charging plug is plugged into the charging port;

the drive module is configured to, when the first level signal is received, output a second level signal that lasts for a first preset time;

the output control module is configured to, when the second level signal is received, output a wake-up signal that lasts for the first preset time to a battery management system;

the rechargeable device is a vehicle, further wherein the input control module comprises a second capacitor, a reverse protection diode, a first MOS transistor, an optical coupler, a third resistor, and a fourth resistor, wherein an anode of the reverse protection diode is configured to receive the external voltage signal, a cathode of the reverse protection diode is connected to one end of the second capacitor, the other end of the second capacitor is grounded, a gate of the first MOS transistor is connected to a junction of the reverse protection diode and the second capacitor, a source of the first MOS transistor is grounded, a drain of the first MOS transistor is connected to a first input end of the optical coupler, a second input end of the optical coupler is configured to receive a second voltage signal from the auxiliary power supply, a first output end of the optical coupler is grounded through the fourth resistor, a second output end of the optical coupler is connected to one end of the third resistor, the other end of the third resistor is configured to receive a first voltage signal from the auxiliary power supply, and the second output end of the optical coupler is further configured to output the first level signal, and/or the output control module comprises a triode, a fifth resistor, a sixth resistor, a second MOS transistor, and a third MOS transistor, wherein a base of the triode is configured to receive the second level signal, an emitter of the triode is configured to receive a first voltage signal from the auxiliary power supply, a collector of the triode is connected to one end of the fifth resistor, the other end of the fifth resistor is connected to one end of the sixth resistor, the other end of the sixth resistor is grounded, a gate of the second MOS transistor is connected to a junction of the fifth resistor and the sixth resistor, a source of the second MOS transistor is grounded, a drain of the second MOS transistor is connected to a gate of the third MOS transistor, a source of the third MOS transistor is configured to receive a second voltage signal from the auxiliary power supply, and a drain of the third MOS transistor is configured to output the wake-up signal; and when the second level signal is received, the triode is turned on, so that the second MOS transistor and the third MOS transistor are turned on, and the turned-on third MOS transistor outputs the wake-up signal.

2. The rechargeable device according to claim 1, wherein the drive module comprises at least a drive unit, wherein the drive unit is configured to, when the first level signal is received, output the second level signal that lasts for the first preset time.

3. The rechargeable device according to claim 2, wherein the drive module further comprises a delay unit, wherein the drive unit is configured to, when the first level signal is received, output, by using the delay unit, the second level signal that lasts for the first preset time.

4. The rechargeable device according to claim 3, wherein the drive unit is specifically configured to, when the first level signal is received, output a third level signal that lasts for a second preset time, wherein the second preset time is less than the first preset time; and the delay unit is configured to, when the third level signal is received, output the second level signal that lasts for the first preset time to the output control module.

5. The rechargeable device according to claim 4, wherein the drive unit comprises a first capacitor, a first resistor, and a second resistor, wherein a first end of the first resistor is connected to a first end of the second resistor, a second end of the first resistor is configured to receive a first voltage signal from the auxiliary power supply, and a second end of the second resistor is grounded; and a first end of the first capacitor is configured to receive the first level signal, a second end of the first capacitor is connected to a junction of the first resistor and the second resistor, and the second end of the first capacitor is configured to output the third level signal that lasts for the second preset time.

6. The rechargeable device according to claim 4, wherein the delay unit is a delay chip, a first input end of the delay chip is configured to receive the third level signal, a second input end of the delay chip is configured to receive a first voltage signal from the auxiliary power supply, and an output end of the delay chip is configured to output the second level signal that lasts for the first preset time.

* * * * *